Figure 1:
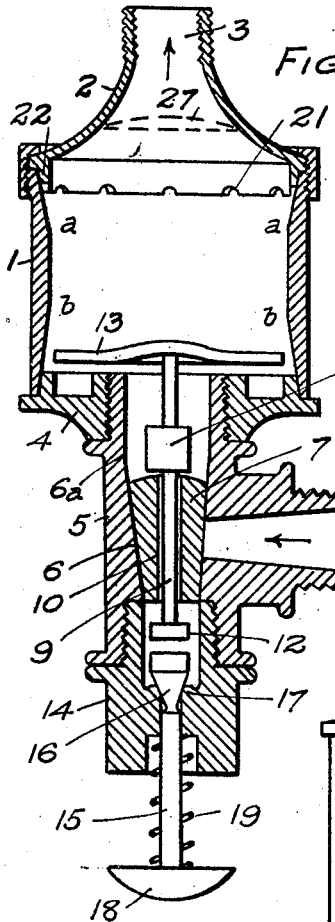

March 22, 1927.  C. H. THOMSON ET AL  1,622,069

FLUID CONTROLLING VALVE

Filed March 9 1925   2 Sheets-Sheet 1

INVENTORS:
Charles H. Thomson
James Cummiskey
Charles J. Miller
Alfred L. Jones by Spear, Middleton, Donaldson & Hall Attys.

March 22, 1927.
C. H. THOMSON ET AL
1,622,069
FLUID CONTROLLING VALVE
Filed March 9, 1925        2 Sheets-Sheet 2
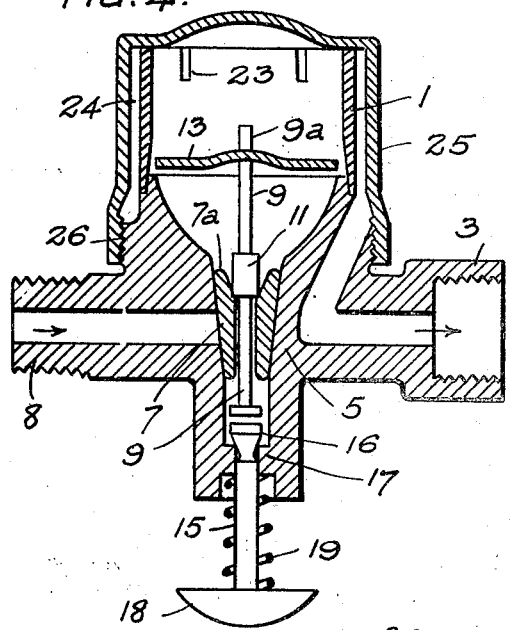
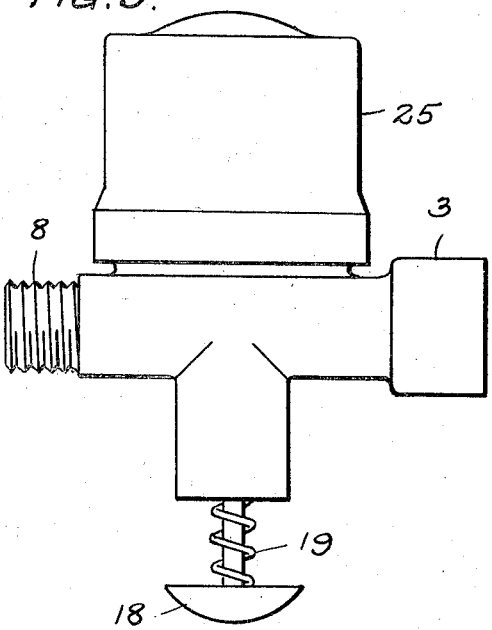
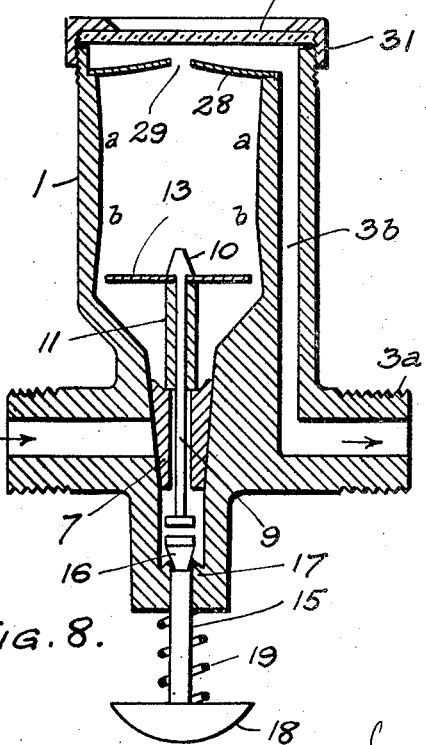
INVENTORS:
CHARLES H. THOMSON
JAMES CUMMISKEY
CHARLES J. MILLER
ALFRED L. JONES.
by Spear, Middleton, Donaldson & Hall Attys.

Patented Mar. 22, 1927.

1,622,069

UNITED STATES PATENT OFFICE.

CHARLES HARRY THOMSON, JAMES CUMMISKEY, CHARLES JOSEPH MILLER, AND ALFRED LESLIE JONES, OF LIVERPOOL, ENGLAND.

FLUID-CONTROLLING VALVE.

Application filed March 9, 1925, Serial No. 14,159, and in Great Britain March 12, 1924.

This invention relates to improvements in apparatus for automatically closing the passage through which a fluid is flowing whenever the pressure at which the fluid is being delivered shall cease or fall below a predetermined point and for sealing that passage against reopening by any other than non-automatic means. The apparatus is suitable for the control of other fluids but is primarily intended to prevent the escape of coal gas from unattended burners, which have been extinguished by the cessation of the gas supply, when that supply shall have been renewed.

According to this invention we provide a conical plug valve for controlling the fluid such as coal gas, adapted to close upon a conical seating, such valve being preferably loosely connected to and operated by a diaphragm in such manner that there may be relative movement between the diaphragm and the valve, the diaphragm being disposed within a cylindrical chamber having a restricted zone therein such that there shall be only a minute clearance past the diaphragm when it is in such zone, such restricted passage for the fluid enabling a comparatively low fluid pressure to sustain the diaphragm and consequently the valve which it controls in the open position thus providing for a low pressure fluid supply through the apparatus. The cylindrical chamber above the restricting zone is flared or provided with ducts, ports or channels such that an increasing passage area for the fluid is obtained as the diaphragm rises, and any increase of pressure in the fluid supply provided for, the diaphragm being then maintained in such flared, or analogous part of the chamber, the floating position of the diaphragm accommodating itself automatically to varying pressures in the fluid supply. The diaphragm and valve are raised initially by a spring controlled plunger the pressure of the fluid supply subsequently sustaining the diaphragm and valve. Any cessation in the fluid supply or a fall of pressure below a predetermined point, will permit the diaphragm to fall and the valve to drop back on its seating and seal the inlet, such sealing being effectually ensured by the later drop of the diaphragm on to the valve which is thus driven home by a slight blow into its seating and can only be opened to renew the supply by the manual operation of pushing up the spring control plunger.

Figure 2:
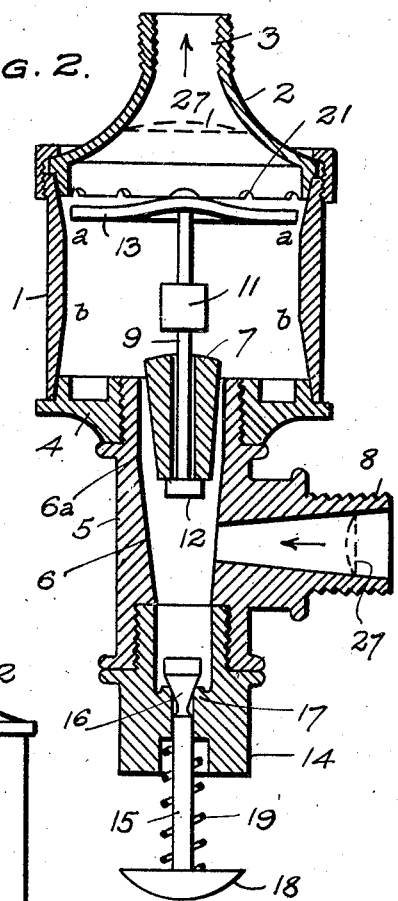
Figures 3, 6:
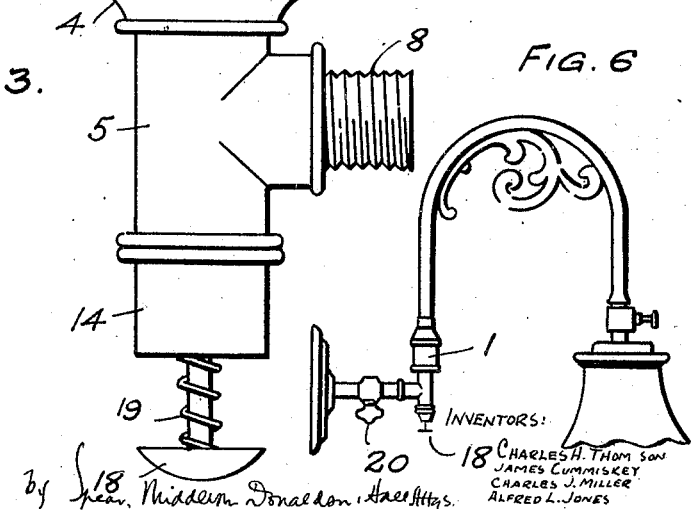

Apparatus in accordance with this invention is illustrated in the accompanying drawings in which Fig. 1 is a vertical section showing the valve closed, Fig. 2 being a corresponding view showing the valve well opened, Fig. 3 being an outside elevation. Figs. 4 and 5 are a vertical section and elevation respectively of a modified form of the apparatus. Fig. 6 is a diagrammatic view showing the application of the apparatus to the control of the gas supply to an ordinary gas light fitting and Fig. 7 is a view showing its application to a gas cooker. Fig. 8 is a vertical section of a further modification.

Hereinafter it will be assumed that the fluid to be controlled by the apparatus is gas and the word gas will be understood to cover any other fluid which it might be desired to control by the invention.

In carrying out the invention we provide a hollow cylindrical chamber 1 the top or cover 2 tapering off in somewhat of a coned formation to the gas delivery orifice 3 which may be threaded, as shown, for connecting up to the fitting the supply of gas to which is to be controlled. The base 4 of the chamber is connected to a valve casing 5 in which is formed a tapered hole 6 forming a seating for the conical plug valve 7. The casing is provided with a gas supply or inlet branch 8. A spindle 9 slides somewhat loosely in an axial hole 10 in the valve 7 so as to permit an appreciable lateral relative movement as between the spindle and the valve, and upper and lower stops 11, 12, are formed on the spindle 9 for engaging the top and bottom of the valve 7, the distance apart of the stops being greater than the depth of the valve so that a restricted range of up and down movement is permitted to the spindle relatively to the plug valve. The top of the valve may be convex, as shown, concave, or flat and the undersurface of the plug valve may be formed convex, concave or flat as shown. If required slight radial grooves may be cut or formed in the upper and lower surfaces of the valve 7 to permit an easy passage of gas to the axial hole 10 in the valve when either of the stops is in contact with the latter. The upper stop 11 is of appreciable weight. Fixed on the top of the spindle 9 where it extends into the chamber 1 is a thin disc or diaphragm 13, preferably of metal. This diaphragm may be slightly dished as shown or it may be flat. The lower part of the casing 5 is enclosed by a cap 14 in which is slidably mounted a plunger 15, the upper end of which is provided with a conical valve head 16 adapted to co-act with a valve seating 17 for the purpose of sealing the interior of the casing 5 against passage of any gas through the hole in the cap in which the plunger 15 slides. The plunger is provided with an operating button 18 and a spring control 19 adapted normally to keep the valve head 16 closed on its seating.

The operation of the apparatus is as follows. Before any supply of gas can pass the apparatus from the inlet 8 to the outlet 3 the plunger 15 must be pushed up manually. If therefore an apparatus as described is connected up to the gas fitting as shown in Fig. 6 and the usual gas tap 20 is turned on, no gas will pass until the plunger button 18 is pushed up. This will lift the spindle 9 the lower stop 12 pushing up the valve 7 when gas will flow round the valve through the tapered hole 6 into the chamber 1. The gas will blow the diaphragm 13 towards the top of the chamber, say to the position shown in Fig. 2, and the diaphragm will in turn lift and sustain the valve 7 on the stop 12, the gas passing round the periphery of the diaphragm 13 to the outlet 3. Should the supply of gas cease the diaphragm will fall, permitting the valve 7 to drop back into its seating in the tapered hole 6 closing the gas inlet port to the valve seating, and the impact of the upper stop 11 falling on the valve will drive the latter home in its seating, effectually sealing the inlet port against any passage of gas through the apparatus should the tap 20 be again turned on to restore the supply. In such an event gas cannot pass through the apparatus until the plunger 15 is again pushed up.

In order to enable the apparatus to pass a very small quantity of gas so that burners may be kept low, the cylindrical chamber 1 is formed with a waist or restricted zone, say, between the points a and b, the diameter of which is only slightly larger than that of the diaphragm 13, say about two thousandths of an inch larger, and above and below this restricted zone the bore of the chamber 1 is flared, as shown. These flarings may be conical, as shown, or curved bell mouths gradually merging into the parallel portion of the restricted zone.

With such an arrangement when the plug valve 7 is lifted by the plunger the admitted gas will blow the diaphragm up the cylinder until it floats in the upper flaring of the cylinder and as the volume and pressure of the gas admitted by the tap increases or diminishes the diaphragm will rise higher in the flaring or fall lower therein, the varying peripheral clearance round the diaphragm thus accommodating itself automatically to the changing volume of gas passing. If the gas tap be turned well down the diaphragm will fall gradually until it reaches a point in the restricting zone between a and b at which, the annular clearance being minute, the accumulating pressure beneath the diaphragm will keep it suspended, sufficient gas passing the diaphragm to give a very low light. This is an important feature of the apparatus as it is desirable to be able to maintain a low light at times without such pressure reduction causing the diaphragm to fall back and the valve to close. Below the point b the cylinder is also flared so that when the supply of gas is cut off by the tap the diaphragm may fall suddenly, any cushioning of gas below the diaphragm being prevented by the larger annular clearance provided by the lower flaring. In this way the diaphragm is permitted to drop suddenly after passing the point b, the upper stop 11 falling on the plug valve 7 with a perceptible click and ensuring an effective seal.

In place of the upper and lower flarings vertical grooves or ducts may be formed in the internal wall of the cylinder 1 to provide a passage past the periphery of the diaphragm when the latter is in its upper or lower positions in the cylinder and in order to provide an exit for the gas to the delivery 3 when the diaphragm 13 is blown right up in the cylinder a series of radial ducts 21 may be formed in the flange 22 of the cover 2, the gas passing round the diaphragm and through these ducts to the exit.

In the modification shown in Figs. 4 and 5 a straight through form of apparatus is provided the inlet 8 being opposite the outlet 3. When the valve 7 is open the gas passes up the chamber 1 and through a series of ports 23 to an annular passage 24 which communicates with the outlet 3. In this modification the cylinder 1 is detachable from the valve casing 5 and is held in place by an outer enclosing cap 25 which screws on the casing at 26. The top of the valve 7 is recessed at $7^a$ to receive the upper stop 11. The operation of this form of the apparatus is similar to that previously described.

In the modification shown in Fig. 8 the gas delivery orifice $3^a$ communicates with a side passage $3^b$ in the casing 1 and in order that the gas to this outlet passage $3^b$ may be drawn evenly round the diaphragm 13 a deflector 28 is fitted at the top of the cylindrical chamber 1 having a central aperture 29. The end of the spindle 9 is made coned shaped at 10 so that when forced up in the chamber 1 by the diaphragm being subjected to very high gas pressures the coned end 10 will enter and partly close the aperture 29, thus regulating the pressure of gas passing to the consuming apparatus. The upper stop 11 which forms the hammer for the plug 7 may be formed as shown of a piece of tubing extended to the under side of the diaphragm, thus firmly positioning the stop 11 on the spindle.

The lid of the cylinder may be formed of a disc of glass 30 forming an inspection window and retained on the top of the chamber 1 by a screwed ring 31. In order to minimize any possibility of dust lodging between the valve head 16 and its seating 17 the latter may be formed coned shaped as shown.

To facilitate the flow of gas passing the diaphragm, the latter may have its periphery slightly flattened in places and one or more holes may be formed in the diaphragm for the same purpose.

The apparatus is intended to be used with its axis vertical but it will operate with its axis inclined at a considerable angle or even inverted, springs being then employed to effect the action of the apparatus which in its normal position is obtained by gravity.

Although it is preferred that the plug valve 7 be loose on the spindle 9 it may be fixed thereto. Gauze filters 27 may be fitted in the inlet and outlet orifices. The upper part of the hole 6 above the valve seating may be parallel as shown at 6ª and in such case the diameter of the parallel part should be greater than that of the widest part of the valve. The amount of rise permitted to the diaphragm is preferably such that the plug valve 7 will never come completely out of the hole 6ª.

If desired instead of the upward movement of the diaphragm being limited by contact of its edge with the flange of the top cover 2, the spindle 9 may be extended at 9ª above the diaphragm and adapted, in the form shown in Fig. 4, by contact with the enclosing cover 25 to limit such upward movement.

We claim:

1. A fluid control valve mechanism, comprising, a valve for controlling the passage of fluid through the mechanism, a cylinder through which the fluid passes, a floating diaphragm in the cylinder of larger area than the valve and loosely connected thereto, said diaphragm supporting the valve in its open position only while fluid is passing through the cylinder and acting on the diaphragm, and manually operated means for opening the valve initially.

2. A fluid control valve mechanism, comprising a valve for controlling the passage of fluid through the mechanism, a cylinder through which the fluid passes, a diaphragm in the cylinder of larger area than the valve and loosely connected thereto, said diaphragm supporting the valve in its open position only while fluid is passing through the cylinder and acting on the diaphragm, a spindle on the diaphragm passing through a hole in the valve, stops on the spindle spaced apart wider than the depth of the valve and adapted to make contact with the top and bottom of the valve in order to close the latter or open it, and manually operated means for opening the valve initially.

3. A fluid control valve mechanism, comprising, a valve for controlling the passage of fluid through the mechanism, a cylinder through which the fluid passes, a diaphragm in the cylinder of larger area than the valve and loosely connected thereto, said diaphragm supporting the valve in the open position only while fluid is passing through the cylinder and acting on the diaphragm, a restricted zone in the bore of the cylinder within which the diaphragm works with only a minute clearance, said cylinder being so shaped adjacent the zone as to give an increasing peripheral clearance to the diaphragm, a spindle on the diaphragm passing through a hole in the valve, stops on the spindle spaced apart wider than the depth of the valve and adapted to make contact with the top and bottom of the valve in order to close the latter or open it, and manually operated means for opening the valve initially.

4. A fluid control valve mechanism, comprising, a valve for controlling the passage of fluid through the mechanism, a cylinder through which the fluid passes, a diaphragm in the cylinder of larger area than the valve and loosely connected thereto, said diaphragm supporting the valve in its open position only while fluid is passing through the cylinder and acting on the diaphragm, a restricted zone in the bore of the cylinder within which the diaphragm works with only a minute clearance, said cylinder being flared adjacent the zone to give an increasing peripheral clearance to the diaphragm, a spindle on the diaphragm passing through a hole in the valve, stops on the spindle spaced apart wider than the depth of the valve and adapted to make contact with the top and bottom of the valve in order to close the latter or open it, and manually operated means for opening the valve initially.

5. A fluid control valve mechanism, comprising, a valve for controlling the passage of fluid through the mechanism, a cylinder through which the fluid passes, a diaphragm in the cylinder of larger area than the valve and loosely connected thereto, said diaphragm supporting the valve in its open position only while fluid is passing through the cylinder and acting on the diaphragm, a restricted zone in the bore of the cylinder within which the diaphragm works with only a minute clearance, said cylinder being flared below the zone to prevent cushioning of the diaphragm as it falls, a spindle on the diaphragm passing through a hole in the valve, stops on the spindle spaced apart wider than the depth of the valve and adapted to make contact with the top and bottom of the valve in order to close the latter or open it, and manually operated means for opening the valve initially.

6. A fluid control valve mechanism, comprising, a valve for controlling the passage of fluid through the mechanism, a cylinder through which the fluid passes, a floating diaphragm in the cylinder of larger area than the valve and loosely connected thereto, said diaphragm supporting the valve in its open position only while fluid is passing through the cylinder and acting on the diaphragm, and a slidable spring controlled plunger by which the valve may be opened initially.

7. A fluid control valve mechanism, comprising, a valve casing, a valve for controlling the passage of fluid through the mechanism, a cylinder detachably fitting the mechanism through which cylinder the fluid passes, an outer enclosing cover for retaining the cylinder, an annulus between the cover and the cylinder into which the fluid passes from the cylinder, a diaphragm in the cylinder of larger area than the valve and loosely connected thereto, said diaphragm supporting the valve in its open position only while fluid is passing through the cylinder and acting on the diaphragm, and manually operated means for opening the valve initially.

In testimony whereof we affix our signatures.

CHARLES HARRY THOMSON.
JAMES CUMMISKEY.
CHARLES JOSEPH MILLER.
ALFRED LESLIE JONES.